US008375356B2

(12) United States Patent
Rathbone et al.

(10) Patent No.: US 8,375,356 B2
(45) Date of Patent: Feb. 12, 2013

(54) TABULAR COMPLETION LISTS

(75) Inventors: Daniel O. Rathbone, Seattle, WA (US); Kevin A. Pilch-Bisson, Snohomish, WA (US); Karen K. Liu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1049 days.

(21) Appl. No.: 12/139,508

(22) Filed: Jun. 16, 2008

(65) Prior Publication Data

US 2009/0313597 A1     Dec. 17, 2009

(51) Int. Cl.
    *G06F 9/44*     (2006.01)
(52) U.S. Cl. ....................................................... 717/112
(58) Field of Classification Search ........................ None
    See application file for complete search history.

(56) References Cited

U.S. PATENT DOCUMENTS

| | | | | |
|---|---|---|---|---|
| 6,305,008 | B1 * | 10/2001 | Vaidyanathan et al. | 717/111 |
| 6,748,582 | B1 | 6/2004 | Chiles et al. | |
| 6,799,718 | B2 | 10/2004 | Chan et al. | |
| 7,076,772 | B2 | 7/2006 | Zatloukal | |
| 7,127,707 | B1 | 10/2006 | Mishra et al. | |
| 2002/0016953 | A1 | 2/2002 | Sollich | |
| 2005/0066306 | A1 * | 3/2005 | Diab | 717/108 |
| 2005/0125741 | A1 * | 6/2005 | Clow et al. | 715/794 |
| 2006/0026559 | A1 * | 2/2006 | Gunturi et al. | 717/110 |
| 2006/0080655 | A1 * | 4/2006 | Prevost | 717/173 |
| 2006/0090154 | A1 | 4/2006 | Bustelo et al. | |
| 2006/0212463 | A1 * | 9/2006 | Jensen et al. | 707/101 |
| 2006/0271920 | A1 * | 11/2006 | Abouelsaadat | 717/137 |
| 2007/0234288 | A1 | 10/2007 | Lindsey et al. | |
| 2008/0066062 | A1 | 3/2008 | Zatloukal et al. | |
| 2008/0235677 | A1 * | 9/2008 | Aniszczyk et al. | 717/165 |

OTHER PUBLICATIONS

Anson, "Anson Horton's Blog", Posted: Thursday, Oct. 19, 2006. http://blogs.msdn.com/ansonh/.
"Eclipse PHP Integrated Development Environment", 2008. pp. 5 http://www.eclipse.org/proposals/php-ide/.
St Laurent, Simon "Using Visual Studio .NET: IntelliSense and Debugging", Date: 2005, pp. 1-5.
Strahl, Rick, "Calling VFP COM Components from .Net and ASP. Net", Date: Apr. 24, 2003, 21 Pages http://www.west-wind.com/presentations/VfpDotNetInterop/aspcominterop.asp.

* cited by examiner

*Primary Examiner* — Wei Zhen
*Assistant Examiner* — Adam R Banes (57) ABSTRACT

A tabular completion list displays customizable rows and columns including information such as but not limited to return types of methods, types of local variables and properties, parameters for methods, a namespace in which a type is defined, an assembly in which a type is defined, accessibility, or a type from which members are inherited. The context of the tabular completion list may be preserved by persisting the completion list display or by transferring the context of a selected row of field in a row of the tabular completion list to a different feature. User interaction options with the tabular completion list may include: selection of the columns that are displayed in the completion list, persisting the completion list display, transferring the context of the completion list window to other features and sorting of the rows of tabular information according to different columns.

17 Claims, 6 Drawing Sheets

TABULAR COMPLETION LISTS

BACKGROUND

As software programming languages have increased in power and capability, the programs written in these languages have become more complex. As a result, tools that make programming easier are in demand. One way to assist programming development efforts is through the use of an Integrated Development Environment (IDE). An IDE typically has one or more browsers and editors that facilitate editing multiple source files. In addition, the IDE may also provide a browser allowing the developer to navigate and view a class hierarchy for code written in object-oriented languages.

An auto-completion feature that completes a symbol name the programmer is typing is another popular programming tool. Before the existence of auto-completion features, to look up a definition of a complex data structure, a user located the file containing the data structure definition, or the class name in the class hierarchy browser. He or she then located the data structure definition in the file, which typically involved either scrolling through the file or using a text search capability to search through the file. Once the definition was located, the user swapped back and forth between the display containing the definition of the structure (either in a file display or a class hierarchy display) and the display in which the developer was currently adding code referencing the structure, and manually inserted the appropriate data structure reference into the code display.

An auto-completion feature may provide a convenient way to insert code to access types and their members, including fields, properties, and methods. In some auto-completion tools, marker characters such as periods, or other separator characters, may be detected by the auto-completion feature. When the user types one of the marker characters after the name of an entity having one or more accessible members, the auto-completion feature may start suggesting matches in a pop-up display. A user can either accept the suggestion by typing a statement completion character or continue typing the name. As the user continues typing, the auto-completion feature may filter the universe of available matching options until a single selection remains.

An auto-completion feature may be one of the most used and useful of available programming tools. An auto-completion feature may speed up software development by reducing the amount of name memorization and keyboard input. It may also reduce reliance on external documentation because interactive documentation on many symbols in the active scope may appear dynamically while programming. Even so, the amount of information provided in known auto-completion features is somewhat limited. Typically, an auto-completion feature simply displays a list of items sorted in alphabetical order. Typically, user interaction with the completion list feature is limited to selecting one of the items appearing on the list by highlighting it and pressing a statement completion character or key to auto-complete a statement in the source code.

SUMMARY

Type and parameter information including but not limited to return types of methods, types of local variables and properties, parameters for methods, a type from which members are inherited, the assembly in which a type is defined, namespace (for the namespace in which a type is defined), Type Kind (to differentiate classes from enums from structs from interfaces from primitives), accessibility and so on may be displayed in a tabular completion list display. Tabular information may be presented in customizable columns in the tabular completion list display. The context of a row or a field of a row selected in the tabular completion list may be preserved by persisting the completion list display or by transferring the context of the tabular completion list to a different feature.

User interaction options with the tabular completion list may include: selection of the columns that are displayed in the completion list, persisting the completion list display, transferring the context of the completion list window to other features and sorting of the rows of tabular information according to different columns. The information displayed in the tabular completion list display may be sorted according to any of the columns shown, such as the type of local variables and properties, the return types of methods, the type from which a member was inherited, the assembly in which a type is defined, namespace (for the namespace in which a type is defined), Type Kind or accessibility. Examples of other tools that could receive the context of the completion list include but are not limited to an object browser, a tool that displays a hierarchy of classes, help, a tool that displays a hierarchy of calls or callers, a watch feature, a debug feature, a debug breakpoint feature or others.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

When viewing a completion list, as presently known, a user cannot see the type of local variables and properties, the return type of methods, the parameters of methods, or the type from which each member was inherited. Moreover, the completion list has a context that may be useful to the user that is lost as soon as the user auto-completes a statement. A user selection of a method of a class within the completion list, for example, contributes to this context. When the completion list display disappears, this context is lost. After the completion list disappears, if a user wants to investigate his selection within the completion list, he can either bring back the completion list with the same context, or else he can investigate the class using a separate feature, (if it is available), which involves repeated work or a further process of navigation and selection.

A tabular completion list may be provided in accordance with aspects of the subject matter disclosed herein. The tabular completion list may display type and parameter information and may be customizable or configured according to the user's selections. The tabular completion list display may be persisted and the context of the tabular completion list display may be transferred to other programming tools or features.

Assume a C# application being edited in Visual Studio has the following classes:

```
class Bicycle : Vehicle
{
    private Wheel FrontWheel;
    private Wheel BackWheel;
    public int Weight;
    public Color PaintColor;
    public void Move(int distance) { }
    public int GetSpeed( ) { return 5; }
}
class Wheel : BicyclePart { }
    class BicyclePart { }
    class Color { }
    class Vehicle { }
```

When the developer references a class in source code, e.g.:
  Bicycle bike1;
  Bike1.
as soon as the user types the period after bike1, the Tabular Completion List automatically displays a table of all the available members of Bicycle that are in scope for the reference of bike1. This may include FrontWheel, BackWheel, Weight, PaintColor, Move, and GetSpeed. For each of the rows in the table, different columns may list additional respective information, such as return type, parameters, and accessability. For instance, the row for 'Move' would include 'void' as the return type, 'int distance' as a parameter, and 'public' as the accessibility.

In a different code location, a user's cursor location in the code may not be on a specific class reference, and the Tabular Completion List may not be automatically displayed. In this case the user can 'force' the Tabular Completion List to display by pressing a predefined key combination. The Tabular Completion List then may display a table of all available types and variables that are in the scope of his current code location. For each row in the table, the different columns list additional respective information for each type or variable, such as the type from which it is inherited, the assembly in which it is defined, and its accessibility.

When a Tabular Completion List is displayed, the user can then select a row by using the arrow keys, and that row becomes highlighted. If the user hits a specific completion character key then the appropriate symbol is inserted into his code, and the Tabular Completion List disappears. If the user hits a specific key to persist the Tabular Completion List, then the list remains and retains its context after the user selects a symbol to be inserted into his code. If the user presses a specific key to transfer the context of the Tabular Completion List, then the appropriate type, member, or symbol is found in a different tool that corresponds to the highlighted row of the Tabular Completion List.

Tabular Completion Lists

Figure 1:
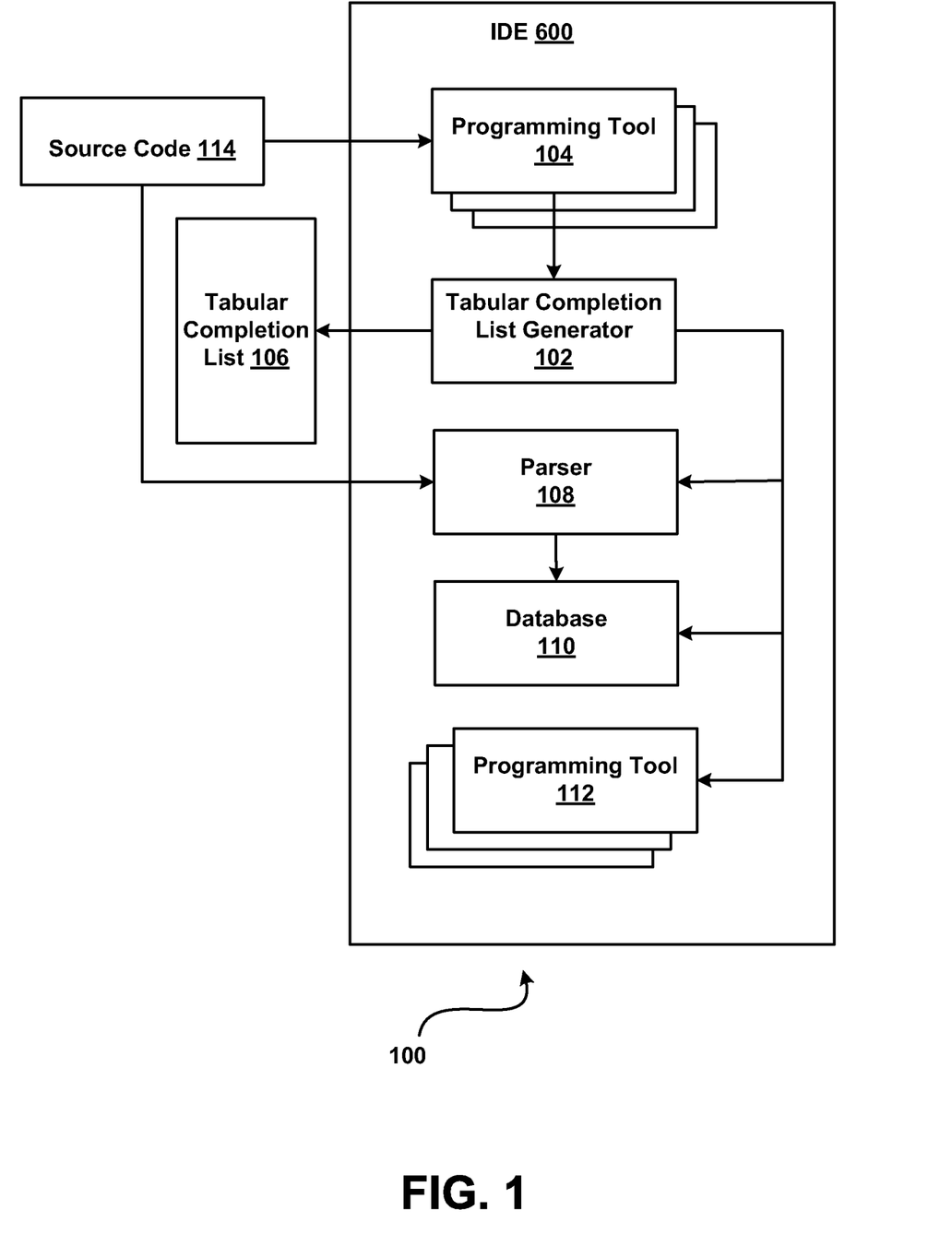
FIG. 1 is a block diagram of an example of a system for generating a tabular completion list and/or transferring a context of the tabular completion list in accordance with aspects of the subject matter disclosed herein.

FIG. 1 illustrates a block diagram of a system 100 for generating a tabular completion list in accordance with aspects of the subject matter disclosed herein. System 100 may include one or more of the following: a tabular completion list generator 102, a programming tool or feature of a programming tool 104 in which program source code is written that invokes the tabular completion list generator 102, a parser 108, a database 110 and a programming tool 112 or feature of a tool to which a context selected in a tabular completion list display 106 may be transferred. Those of ordinary skill within the art will appreciate that system 100 also may include other components, not shown in FIG. 1. All or portions of system 100 may reside on one or more computers such as the computers described below with respect to FIG. 4. The system 100 or portions thereof may comprise a portion of an integrated design environment 600 (IDE) such as the ones described and illustrated below with respect to FIG. 5, residing on one or more computers such as the computers described with respect to FIG. 4 also described below. Alternatively or in addition, system 100 or portions thereof may be provided as a stand-alone system or as a plug-in.

Tabular completion list generator 102 may be invoked by programming tool 104 and may receive program source code 114 entered in programming tool 104. Contemplated programming tools such as programming tool 104 or features which may invoke tabular completion list generator 102 may include but are not limited to an editor, a watch window, a class diagram, a break point condition feature, a debugging feature or any other feature or tool in which a user may type program source code or in which a completion list feature may be invoked. A contemplated debugging feature includes but is not limited to an immediate debugging feature in which code expressions are inserted by the user and dynamically evaluated. Tabular completion list generator 102 may also be invoked from outside programming tool 104 by entering a specified series of keystrokes or by selecting from a menu of options.

Source code 114 entered in programming tool 104 may be a text description of a computer program, written in any programming language or script language, whether imperative, object-oriented, functional, or logical. The source code may comprise a series of statements comprised of expressions. The expressions in a statement may be divided into multiple component parts. Each statement may be composed of various programming language tokens or symbols, which may be combined to form declarations and definitions that describe the entities that make up the computer program. Identifiers may be used to identify particular entities in the program, and may include function names, variable names, type names, macro names and template names. Various entities and identifier mechanisms are used in various programming languages.

System 100 may also include programming tools or features such as a programming tool 112 to which a context of a selected element of a tabular completion list display may be transferred. Contemplated programming tools 112 to which a context of a selected element of a tabular completion list display may be transferred include but are not limited to: an object browser, a class view, a find in class diagram tool, a project or solution explorer, or any other suitable tool.

Parser 108 may be capable of parsing any of one or more programming languages. For example, parser 108 may parse the following programming languages: C, C++, C#, F#, IronRuby, IronPython, Pascal, Visual BASIC, Java, etc. System 100 may also include an interpreter. Parser 108 may parse source code 114 according to parsing rules applicable to the programming language in which the source code 114 is written. The parser 108 may parse a subset of the source code 114 dynamically, for example the parser may parse a programming construct currently being typed or edited.

Parser 108 may be enhanced to support parsing only a portion of the code. Because the code is incomplete (i.e., the developer is in the midst of writing the code) the parser may include heuristics to ignore certain non-fatal errors. Among these errors are missing statement terminators, missing closing parenthesis, missing closing braces, missing function terminators and the like. In addition, the parser may be able to ignore errors resulting from unknown identifiers, unknown data types and unknown or missing function parameters. The parser may also be able to recover from what would otherwise be considered a fatal error and continue parsing the remaining code following the section causing the error. Also, the parser may be able to make reasonable determinations as to how conditionally compiled sections of code are to be parsed.

The parser may be able to parse subsets of code residing in memory buffers, rather than reading the code from a file. This may improve parsing speed enabling feedback to be provided to a developer as he is modifying his code.

Tabular completion list generation 102 may be invoked by a programming tool 104 such as an editor, for example, upon the occurrence of an event and may employ the method described below with respect to FIG. 3 to automatically complete certain expressions and statements as the developer is editing source code or to perform the other functions described below.

Database 110 may be a file on stable storage or in memory, the file comprising a database that may be used by the parser to store information including, but not limited to, class definitions, member data types, and reference information such as source file names and line numbers where a token, symbol or identifier is defined or referenced. Database 110 may be a dynamic representation of various aspects of the program under development, and may be dynamically queried and updated by the parser as the source code is modified or added to by the developer. Database 110 may include information from the source code. It may also include information from other sources including system header files, Microsoft Foundation Class (MFC) header files and ActiveX Template Libraries (ATL), comments extracted from source code, separate documentation files, and online help. The database 110 may store an indicator as to which of the above-mentioned sources was used to populate the particular database record. Database 110 may be referred to as an NCB (No Compile Browse) file, and may be populated and maintained by the parser. Database 110 may be created in memory when a project is opened in an IDE.

While database 110 may appear to a user to be a single database, database 110 may be comprised of multiple stores or databases. A first database may, for example, be referred to as a project database and may be dynamically updated by the parser, as described above. In addition to the first dynamically updated database, one or more pre-built databases may exist. The pre-built databases may contain information that seldom changes, such as operating system definitions and header files, Microsoft Foundation Class definitions and header files, class library documentation files, online help, and the ActiveX Template Library referred to above. The pre-built database may be created in memory when a project is opened in an IDE. Some of the information may rarely change and thus may not be stored in the same database as the dynamically updated database. This may allow the parser to dynamically parse the user developed code, which does change frequently, in a more performant fashion.

In accordance with some aspects of the subject matter disclosed herein, the system of FIG. 1 may operate as follows.

A developer may enter a portion of source code 114 within a programming tool 104. As the developer enters the source code 114, an event may be detected which invokes tabular completion list generator 102. Tabular completion list generator 102 may invoke a parser 108 which may be a dynamic parser to parse a code fragment of the source code 114 using information from database 110, and may provide context-sensitive choices to the developer to complete the current statement or to perform any of the functions described below with respect to the tabular completion list generator 102. In accordance with some aspects of the subject matter disclosed herein, the detected event may occur when certain programming language defined constructs are entered into the programming tool 104 by the developer. Alternatively or additionally, the tabular completion list generator 102 may be invoked when the user enters a hot key. A hot key, as is known in the art, is a keyboard character or sequence of characters which, when pressed, invoke particular functionality. The tabular completion list generator 102 may be invoked when a cursor controlled by a pointer device is positioned over an expression for at least a predetermined amount of time. The tabular completion list generator 102 may be invoked when the user selects a menu entry or an icon or enters some particular sequence or combination of keystrokes.

The information presented to the user in the tabular completion list display 106 may be dependent on the context provided by the current source code and the position of the cursor within the source code. For example, if the cursor is positioned in an area containing white space, the tabular completion information presented to the user may include all language tokens that are potentially valid at that point in the code. This may include local variables, global variables, function identifiers, class identifiers, keywords, and any other token that is valid at that point in the source code. If the cursor is positioned near a class member reference, the tabular completion information presented may be filtered to those identifiers that are particularly relevant to the class, such as class member identifiers and class function identifiers. If the cursor is positioned after a variable or class attribute identifier, the tabular completion information presented may include operator tokens. In general, the information presented may comprise those language tokens that are potentially valid at the point in the source code identified by the cursor position.

In operation, a user may employ an editor or other programming tool 104 to input program source code. As soon as the user types one or more characters of a token, the tabular completion list generator 102 may display a tabular completion list display 106 comprising separate rows and columns in the completion list display, which allows the display to present tabular data instead of a simple list. Examples of the data which can be presented in a tabular completion list display 106 include return types for methods, types of variables, types of properties, accessibility, member type, glyphs to represent member types, a type from which the member is inherited and so on.

The information and the way that the information is presented in tabular completion list display 106 may be customizable or configurable by the user. Columns and thus what kind of data is displayed in the tabular completion list display 106 may be selectable. For example, if a user wants a tabular completion list display 106 to show the return types of methods but not accessibility of methods, the user may optionally select the return type column causing it to be displayed or may de-select the accessibility column causing the accessibility column to not be displayed. In conventional completion lists, a user may select an individual item within the list. In contrast, a tabular completion list display 106, which shows tabular data, may allow selection of a whole row or a field within a row. Selecting a field within a row creates a more specific context for the tabular completion list, which is relevant when the context is transferred, as described below.

Configuration of the columns to be displayed in the tabular completion list display 106 may determine whether similar rows are displayed separately or displayed as one single row. For example, consider a method which is overloaded to accept different parameters and overloaded again with different parameters and a different return type. If the tabular completion list display 106 is configured to show only member names and glyphs, then the method and its overloads may be shown as one item in the tabular completion list display 106. The one displayed item may represent the three methods having the same name and glyph. If the tabular completion list display 106 is reconfigured to add a column for return types, then the method and its overload which has a different return type may be displayed as separate items in the tabular completion list display 106. Similarly, if the tabular completion list display 106 is reconfigured to add a column for method parameters, then the method and each of its overloads may be displayed as separate items.

Tabular data in the tabular completion list display 106 may provide different options for sorting the tabular completion list information in the display. In known completion list tools, completion list items are sorted alphabetically by member name, regardless of how the items are filtered. By including tabular data, a tabular completion list feature may allow a user to sort the information displayed in the tabular completion list display 106 according to any of the displayed columns. Items in a tabular completion list display 106 may be sorted by a user interaction such as by clicking on a header column. In response to receiving the user interaction, the rows of the table may be resorted and the tabular completion list information may then be redisplayed in the tabular completion list display 106 in the order established by the sorted column.

The tabular completion list display may be persisted. Persisting the tabular completion list display 106 means that the tabular completion list display 106 does not disappear automatically. Traditional completion list displays disappear whenever the user finishes entering a token, selects an item in the completion list to auto-complete, navigates away from the original cursor location or presses escape. Unlike traditional completion list displays, the tabular completion list feature may display a button, a hotkey or a context menu. Selecting the button, hotkey or context menu option may allow the user to persist the tabular completion list display 106 so that the display does not disappear under any of the conditions mentioned above. A persisted tabular completion list display 106 may be docked as a pane or may float as a resizable and movable display or window.

A persisted tabular Completion List display may provide the same functionality to the user as a Tabular Completion List does before it is persisted, such as displaying a set of items for auto-completion and automatically selecting and filtering the rows displayed according to the context of the user cursor position in the tool in which he is editing code. A persisted tabular completion list display 106 may refresh its contents as the user makes successive changes or navigates to different cursor locations.

The context of a tabular completion list display 106 may be transferable to other tools. The context of the tabular completion list display 106 represents the set of conditions that influence the presentation of the completion list. The conditions may include the following:
the selection of a row in the tabular completion list
the selection of a field within a row of the tabular completion list
a filter over the items displayed in the tabular completion list
the configuration of the columns in the tabular completion list
the position of the user's cursor in the code editor
the set of items displayed in the completion list.
A context may include any of: a variable, a function, a method, a member of a type, a class, as well as any container of these, such as a class, a type, an interface, a namespace, a type library, an assembly, or a program, etc.

Traditional completion lists offer no way to extract or transfer the context to another feature or tool. For example, if a user has a class selected in the completion list, and wants to use the class view to investigate the class, he has to engage in a separate look-up process to find the class in the class view. In contrast, the tabular completion list feature as described herein may in response to a user operation, transfer a context of the tabular completion list to a different feature or tool. The transfer may be initiated by a button, hotkey, or context menu for that purpose.

Figure 2A:
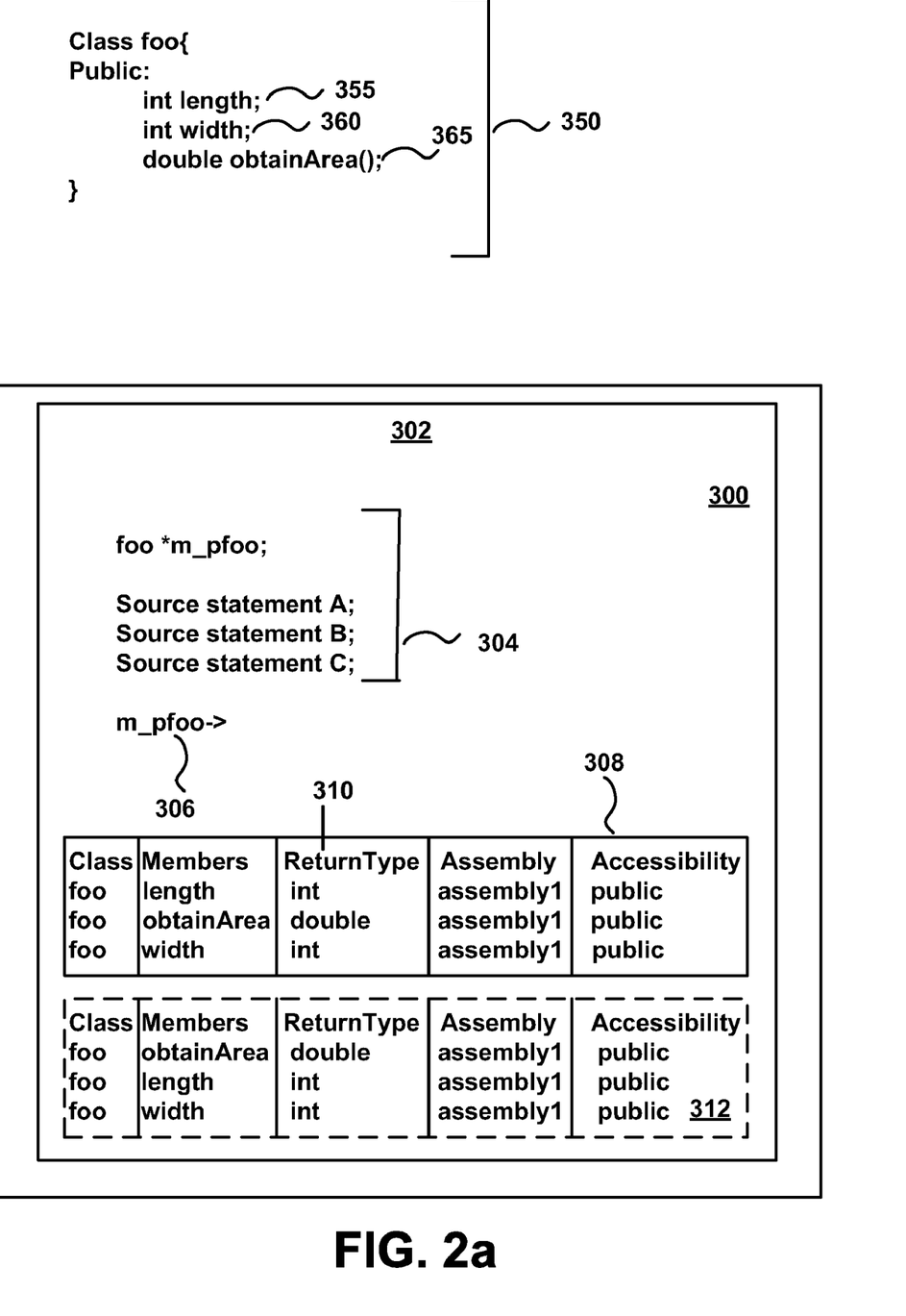
FIGS. 2*a* and 2*b* are illustrations of a section of source code and examples of tabular completion list displays in accordance with aspects of the subject matter disclosed herein.
Figure 2B:
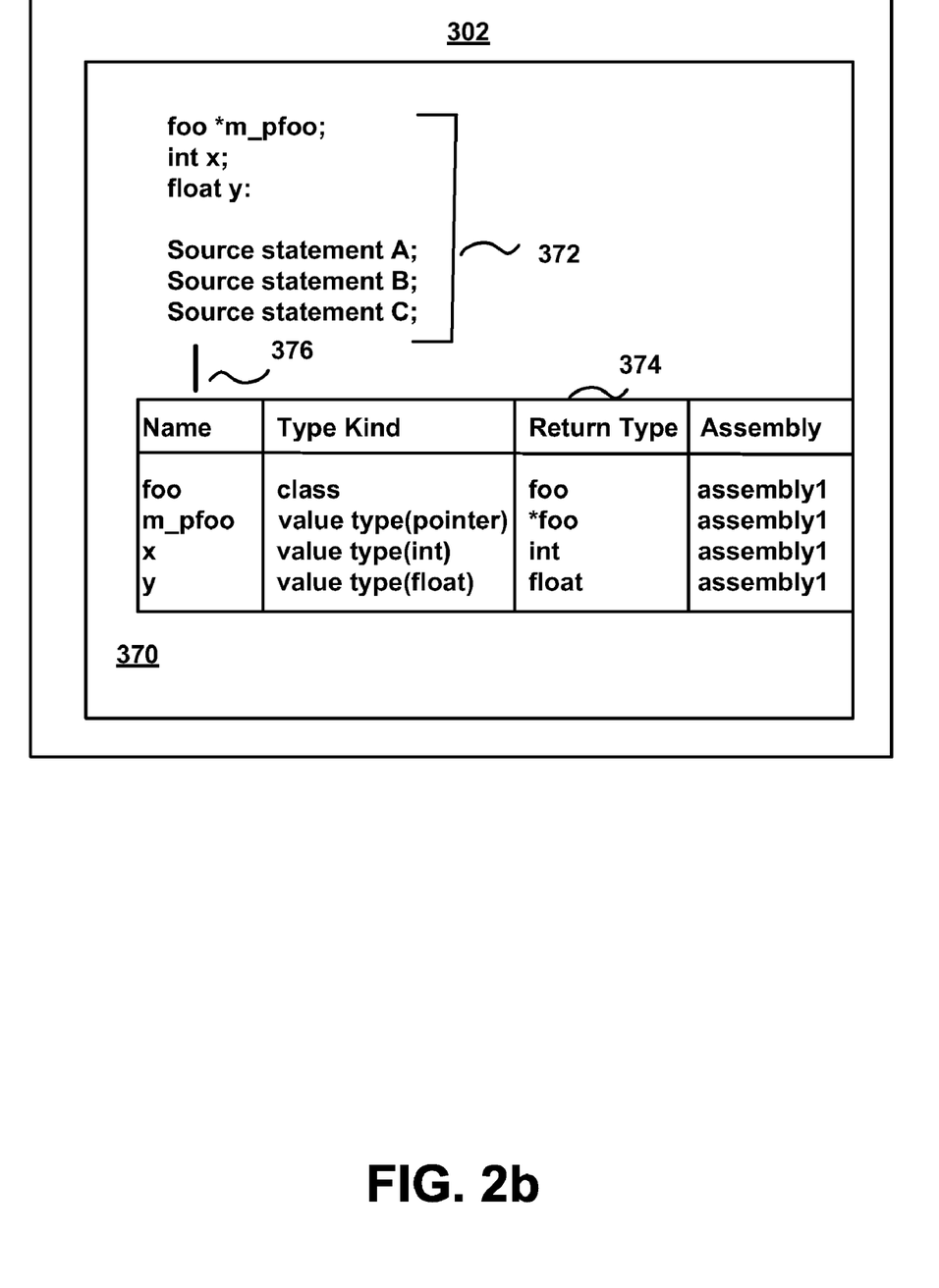

FIG. 2a presents a class definition, and illustrates a representative screen shot of an editing session using the class definition to demonstrate the automatic context-sensitive tabular completion list display of statement completion items in a tabular completion list. FIG. 2b illustrates another representative screen shot of an editing session to demonstrate the automatic context-sensitive tabular completion list display of statement completion items in a tabular completion list. FIGS. 2a and 2b are discussed in the context of the C++ programming language, however the tabular completion list feature described herein is not so limited and is adaptable to any programming language. Referring now to FIG. 2a, a class definition 350 is presented for the class named "foo". Class foo has three member attributes, a length attribute 355, a width attribute 360, and a member function obtainArea 365. Length 355 and width 360 have an integer data type and function obtainArea returns a double precision floating point number. The class definition for class foo may be included in the source code 114 file currently being edited, or it may be included in any of a number of files comprising the source code for the program.

In FIG. 2a, a block diagram of a representative screen shot of a programming tool 104 such as an editor is presented. Within screen 300 of display 302, several previously entered lines of code 304 are shown, along with a current line of code 306. As the developer is editing line 306, the developer may enter an expression component comprising object pointer name, "m_pfoo", which is an attribute that points at an object of class foo. The pointer name is followed by the pointer operator ".fwdarw.". The editor may detect the pointer operator and invoke the tabular completion list generator 102. Tabular completion list generator 102 may invoke the method described below with respect to FIG. 3 and may cause a tabular completion list display such as tabular completion list display 308 to display a list of candidate expression components comprising class attributes of the class to which the object belongs. The developer may perform any of the user interactions described above.

The displayed tabular completion list may contain rows for the members of class foo, any of which could be inserted at the current cursor position. The rows may, for example, include a column for the name of each member, such as 'length', 'width', and 'obtainArea'. Other columns, which the user may select for display, or which may display by default, may include further information about the items of each row. For example, a 'Return Type' column may show 'int' in the rows of items 'length' and 'width', and 'double' in the row for 'obtainArea'. An 'Accessibility' column would show 'public' in the rows for 'length', 'width' and 'obtainArea', and if any private members had been added to the class, the respective row may show 'private' in the Accessibility column. If the user decides he would like to see the rows of the Tabular Completion List sorted according to the Return Type column, he may click on the header for that column, (e.g., header 310) and then the rows of the Tabular Completion List would be redisplayed in order of their return types, so that the 'obtainArea' row with return type 'double' would not be displayed between the rows for 'length' and 'width', as illustrated in tabular completion list display 312.

In FIG. 2b, another example of a representative screen is shown. Display 302 shows a screen 370 including source code statements 372, a current editing position as indicated by a cursor 376 and a tabular completion list display 374. Source code statements 372 include a number of local variable declarations and arbitrary source code statements A, B and C. As shown, cursor 376 is on a blank line below source code statement C. In response to a pre-determined event, the tabular completion list generator uses the method described below in reference to FIG. 3 to display a table of potentially valid tokens and constructs that can be entered at this point in the code. The tabular completion list information is displayed in tabular completion list display 374 and may include local variables, global variables, system function names, class name identifiers and any other token available as determined by the source code, project libraries, system libraries, and the programming language grammar.

The user may perform any of the user interactions described above to display and re-sort the rows of the completion list. In this context, the Tabular Completion List would include a row for the foo class, as well as any other classes the user has defined in his source code. An additional column of Type Kind may be displayed, which would show 'Class' in the row for class foo. The user may choose to sort the Tabular Completion List according to the Type Kind column, in which case foo would be grouped with other classes, not interspersed with other type kinds such as structs and interfaces. If the user decides he would like more information about a row represented in the Tabular Completion List, he may decide to transfer the context to another tool, such as class view. He may click a row within the Tabular Completion List, such as the row for the 'foo' class, which will then be visually highlighted to indicate that it is selected. The user may then press a button to show a context menu which lists the tools to which he may transfer the context of his selection. He may see the class view tool listed in the context menu, and when he clicks that menu item, the class view tool is invoked with the context of his selection in the Tabular Completion List. The class view tool then uses then consumes the context information from the Tabular Completion List according to its own behavior. For example, it may present information about the foo class.

Figure 3:
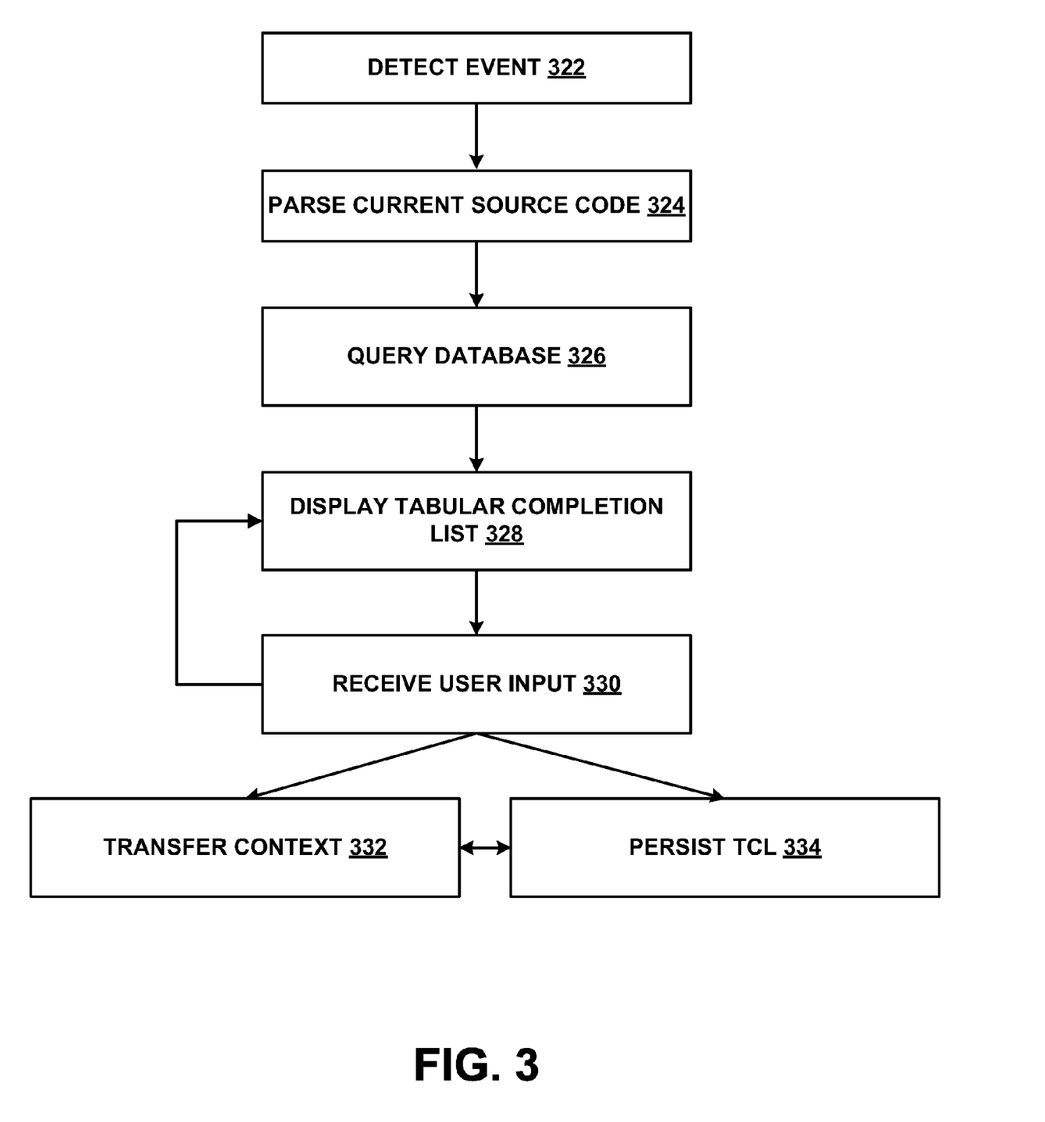
FIG. 3 is a flow diagram of an example of a method for generating a tabular completion list and persisting the tabular completion list or transferring the context of the tabular completion list in accordance with aspects of the subject matter disclosed herein.

The method described in FIG. 3 may be performed in part by one or more programs running on a computer. The program or programs may be executed from a computer-readable medium or from a memory by a processor of a computer. The program or programs may be storable on a computer-readable digital storage medium such as a CD-ROM or other digital storage medium for distribution, installation and execution on another (suitably equipped) computer. Referring to FIG. 3, an example of a method for generating a tabular completion list and/or transferring a context selected in a tabular completion list to a programming tool in accordance with some aspects of the subject matter disclosed herein is shown.

In FIG. 3 at least a section of source code for a computer program may be entered in a programming tool. The referenced source code may be written by a developer using an editor or other programming tool as described above. FIG. 2a illustrates an example of a section of source code and is used here as a non-limiting example to illustrate the method of FIG. 3. In 322, an event indicating that a tabular completion list display may be attempted may be detected. The event may occur when a developer enters one or more separator characters that, as defined by the programming language, separate two components of an expression. For example, the pointer operator (".fwdarw.") is frequently used to separate a component comprising an object pointer reference and a component comprising a member reference. Another separator commonly used is the dot (".") operator, which separates a direct object reference and a member reference. Those skilled in the art will recognize that other separators and events exist that could be used to trigger automatic statement completion. Furthermore, the example just described presents operators used in the C/C++ and Java language, however the tabular completion list feature described herein is not so limited, and can be applied to any programming language.

The event may occur when the developer enters a hot-key. A hot-key is a character such as a function button on a keyboard, or a short sequence of characters that are intended to invoke an action, in this case, display of a tabular completion list. The event may occur when a developer selects from a menu or dialog box, or selects an icon on the screen. The content of the menu or dialog box may be context-sensitive, that is, the contents may be dependent on the source code that is currently being edited and the position of the cursor within the source code. The dialog box may be displayed by performing a click operation using an input device such as pressing a mouse button. The event may occur when a cursor, typically controlled by a pointer device, is positioned over an expression for at least a predetermined amount of time. Other mechanisms to generate an event are known in the art and may be used instead of or in addition to the above-described mechanisms, and are within the scope of the tabular completion list feature described herein.

Upon the detection of an event at 322, the source code as currently written may be parsed at 324. The parser may parse the current statement, if any, being edited. The parser may return information on tokens appearing at the current cursor position (if any), and may provide additional identifying information regarding the token, such as its name, data type, and class membership. The parser may query the database for information regarding names, data types and program elements it discovers along the way before it gets to the current cursor position. The information that the parser returns may depend upon the expression before the cursor position or the token at the cursor position.

At 326 the tabular completion list generator may query the database, which as described above may comprise a file that is created dynamically such as but not limited to a no-compile browse file and/or a pre-built database that includes system header file information, MFC information, and ATL information. The database may be stored in memory, on stable storage or a combination of both. The data returned by the parser may be used in the query to return context-sensitive data. For example, if the parser indicates that the token at the current cursor position is a pointer to a class member, the query to the database may request information on attributes for the particular class. If the cursor is over white space, the query may return a larger set of data comprising information concerning the valid tokens that can be entered at that point in the code. When the cursor is located within the code defining a function, the query to the database may request information concerning function parameters and local variables visible inside the function, i.e. the set of variables and other entities that are within the scope for the function.

At 328, the tabular completion list may be displayed. The tabular completion list may include headers for the columns and may include the information described above. At 330 may perform any of the user interactions described above. In response to the user interactions, a customized or configured version of the tabular completion list may be displayed, and in accordance with the received user interaction, may display the same information, the same information in a different order, or different information, as described above. A developer can select an item from the tabular completion list to be inserted at the current cursor position in the source file.

As the developer enters new characters into the source code, the new information can be used to either provide additional limitations to the query performed at 326, or the information can be used to filter the information returned by the query. This may result in the elimination of entries that are no longer valid or are incompatible with what the developer added or the list is scrolled down to the nearest matching entry, which is highlighted. At any time the user may elect to select an entry for auto-completion by typing a completion character or combination of characters or may elect to dismiss the tabular completion list.

At 332 in response to user interaction with the tabular completion list generator, the selected context may be transferred to another programming tool, as described above. At 334 the tabular completion list, in response to user interaction with the tabular completion list generator may persist the tabular completion list display as described above. As a consequence of selecting an option to transfer the context to another programming tool, the tabular completion list feature may transfer the context to the selected programming tool as described above.

Example of a Suitable Computing Environment

Figure 4:
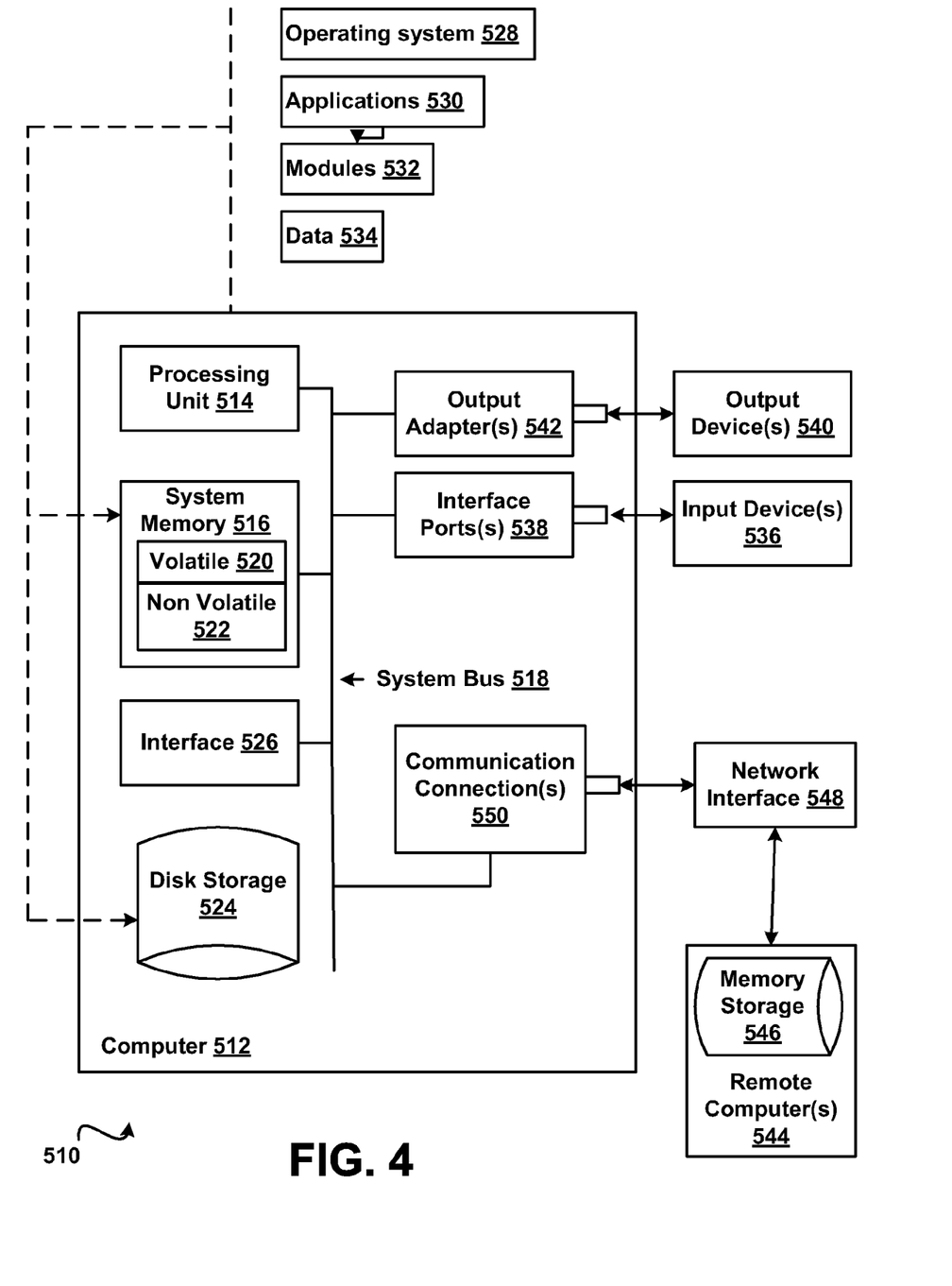
FIG. 4 is a block diagram illustrating an example of a computing environment in which aspects of the subject matter disclosed herein may be implemented.

In order to provide context for various aspects of the subject matter disclosed herein, FIG. 4 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 4, a general purpose computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 4 describes software that can act as an intermediary between users and computer resources. This software may include an operating system 528 which can be stored on disk storage 524, and which can control and allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combination s of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 5:
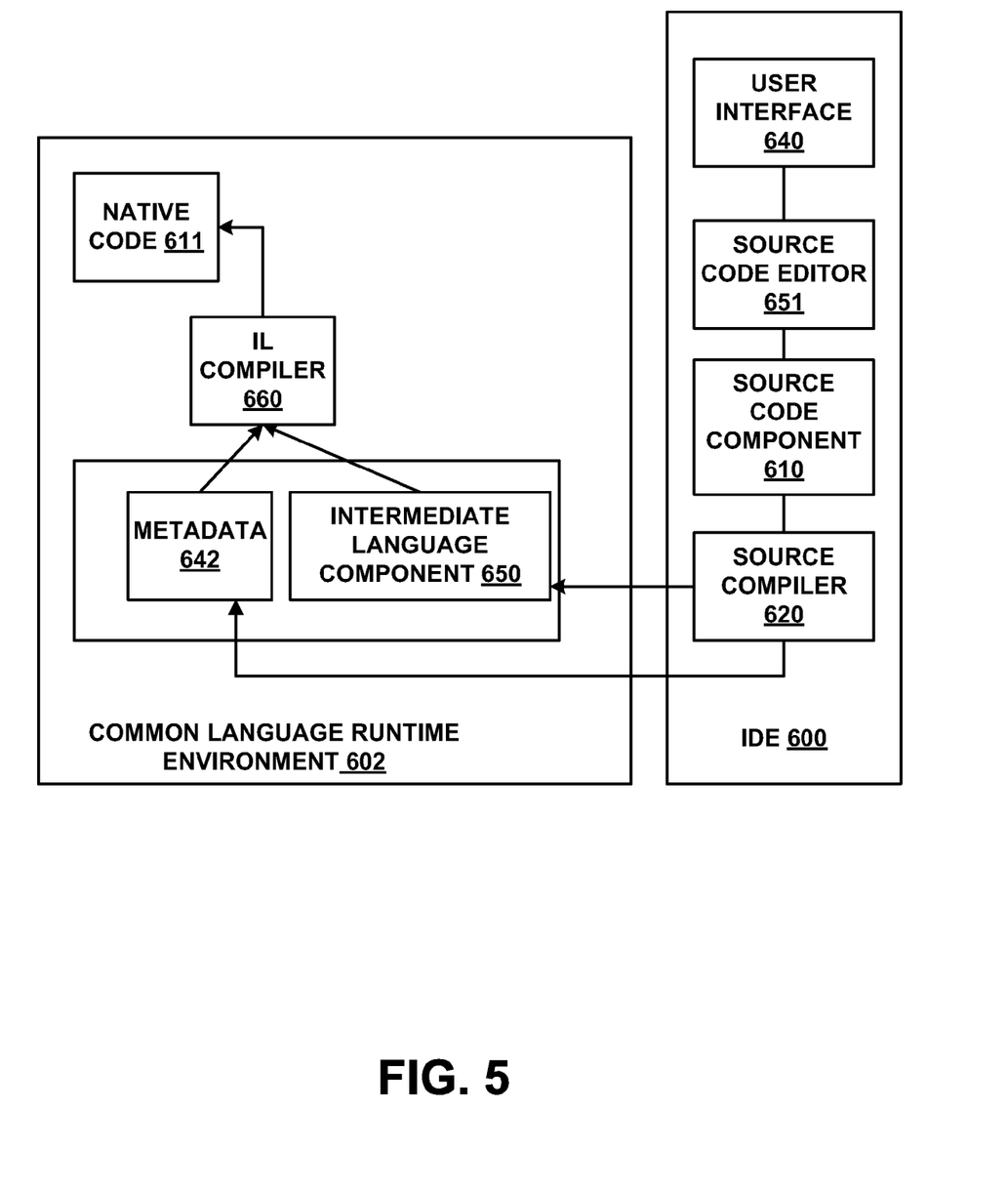
FIG. 5 is a block diagram of an example of an integrated development environment in accordance with aspects of the subject matter disclosed herein.

FIG. 5 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642.

Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed is:

1. A method of generating a tabular completion list comprising:
   detecting an event associated with developing a section of source code for a computer program, the section comprising at least one token of a plurality of tokens, wherein the at least one token or a combination of tokens of the plurality of tokens identifies a program entity;
   issuing a query to a database, the query requesting information concerning the program entity;
   using information returned from the query to display a context-sensitive tabular completion list that is dependent upon the section of source code for the computer program that is currently being edited and a position of a cursor within the source code, the context-sensitive tabular completion list comprising rows and columns of information about the program entity, wherein a row of information includes a name of a class, a name of a member of the class, a return type for the member of the class, an assembly in which the member is defined and accessibility information associated with the member; and
   receiving a user interaction to select an item of the context-sensitive tabular completion list to auto-complete, wherein in response to receiving the user interaction, the tabular completion list persists after selection of the item in the tabular completion list to auto-complete.

2. The method of claim 1, wherein developing the section of source code comprises utilizing a programming tool comprising an editor, a watch window, a class diagram, a break point condition feature, a debugging feature, a tool in which a user may type program source code, or a debugging feature in which expressions are dynamically evaluated for correctness.

3. The method of claim 1, wherein the event comprises entering a hot-key, causing a cursor to be positioned over a token for at least a pre-determined amount of time, selecting an icon, selecting a menu entry, pressing a mouse button, or highlighting the at least one token.

4. The method of claim 2, wherein the programming tool is a first programming tool, further comprising in response to receiving the user interaction, a context associated with a selected row or field in the tabular completion list, the context is transferred from the first programming tool to a second programming tool.

5. The method of claim 4, wherein the second programming tool comprises one of a class diagram, a class view, an object browser, a project/solution explorer, documentation, online help.

6. The method of claim 1, further comprising sorting a column of the tabular completion list and redisplaying the tabular completion list in an order established by the sorted order of a selected header of the tabular completion list column.

7. The method of claim 1, wherein the tabular completion list is configurable by selecting a column to be displayed in the tabular completion list or by deselecting a column not to be displayed in the tabular completion list.

8. A system for generating a tabular completion list comprising:
 a computer comprising:
 a programming tool accepting user input to develop source code for a computer program, the source code having a plurality of tokens that declare and define at least one of a plurality of entities;
 a database including information about the plurality of entities; and
 a tabular completion list generator invoked by the programming tool upon occurrence of an event, wherein the database is queried regarding at least one token of the plurality of tokens and wherein the tabular completion list generator displays a tabular completion list comprising at least one entity relating to the at least one token for potential entry at a current position in the source code, wherein the tabular completion list comprises rows and columns of information about the at least one entity, wherein a row of information includes a name of a variable, a type kind of the variable, a return type for the variable, and an assembly in which the variable is defined, wherein the tabular completion list displayed by the tabular completion list is customizable by:
 selecting a column of the tabular completion list to display in the tabular completion list;
 deselecting a column of the tabular completion list, wherein the deselected column is not displayed in the tabular completion list;
 sorting information displayed in the tabular completion list in an order determined by selecting a column of the tabular completion list;
 persisting the tabular completion list; and
 transferring a context of the tabular completion list to a selected programming tool.

9. The system of claim 8, further comprising: a parser, the parser parsing at least a subset of the source code and returning parser data, wherein the database is queried for information on the program entity.

10. The system of claim 8, wherein the database includes a dynamically updated component and a pre-built component.

11. The system of claim 8, further comprising: persisting the tabular completion list after entry of a token, selects an item in the tabular completion list to auto-complete, navigates away from an original cursor location or presses escape.

12. A computer-readable storage medium, the computer-readable storage medium not consisting of a propagating signal, the computer-readable storage medium having computer-executable instructions for performing a method comprising:
 developing a section of source code for a computer program using a programming tool, the section comprising at least one token of a plurality of tokens, wherein the at least one token or a combination of tokens comprising the at least one token identifies a program entity;
 detecting an event associated with developing the section of source code;
 upon detecting the event, issuing a query to a database, the query requesting information concerning the program entity; and
 using information returned from the query to display a customizable tabular completion list comprising rows and columns of information about the program entity, wherein a row of information of the customizable tabular completion list includes a name of a variable, a type kind of the variable, a return type for the variable, and an assembly in which the variable is defined, wherein the programming tool is a first programming tool, further comprising in response to receiving a user interaction, a context associated with a selected row or field in the tabular completion list, the context is transferred from the first programming tool to a second programming tool.

13. The computer-readable storage medium of claim 12, where in at least one row of information of the customizable tabular completion list further includes a type from which a member of the type is inherited.

14. The computer-readable storage medium of claim 12, wherein the tabular completion list is customizable by: selecting a column of the tabular completion list to display in the tabular completion list; deselecting a column of the tabular completion list, wherein the deselected column is not displayed in the tabular completion list; sorting information displayed in the tabular completion list in an order determined by selecting a column of the tabular completion list; persisting the tabular completion list; transferring a context of the tabular completion list to a selected programming tool comprising an editor, a watch window, a class diagram, a break point condition feature, a debugging feature, or a tool in which a user may type program source code, a debugging feature in which expressions are dynamically evaluated for correctness.

15. The computer-readable storage medium of claim 12, wherein the tabular completion list is displayed in response to detection of an event comprising entering a hot-key, causing a cursor to be positioned over a token for at least a predetermined amount of time, selecting an icon, selecting a menu entry, pressing a mouse button, or highlighting the at least one token.

16. The computer-readable storage medium of claim 12, wherein in response to receiving a user interaction, the tabular completion list persists after a user finishes typing a word, selects an item in the tabular completion list to auto-complete, navigates away from the original cursor location or presses escape.

17. The computer-readable storage medium of claim 12, further comprising sorting a column of the tabular completion list and redisplaying the tabular completion list in an order established by the sorted order of a tabular completion list column.

\* \* \* \* \*